United States Patent [19]

Dunleavy et al.

[11] 4,247,655
[45] Jan. 27, 1981

[54] RIGID AND SEMIFLEXIBLE POLYURETHANE FOAMS PRODUCED WITH PHENOL-ALDEHYDE-AMINE RESINS

[75] Inventors: Raymond A. Dunleavy; James A. McClanahan, both of Charleston, W. Va.

[73] Assignee: Union Carbide Corporation, New York, N.Y.

[21] Appl. No.: 76,626

[22] Filed: Sep. 18, 1979

[51] Int. Cl.$^3$ ............................................. C08G 18/14
[52] U.S. Cl. ..................................... 521/164; 252/182
[58] Field of Search ........................................ 521/164

[56] References Cited

U.S. PATENT DOCUMENTS

| | | | |
|---|---|---|---|
| 3,493,257 | 2/1970 | Fitzgerald et al. | 293/120 |
| 3,514,144 | 5/1970 | Alderfer | 293/107 |
| 3,558,529 | 1/1971 | Whitman et al. | 521/174 |
| 3,580,869 | 5/1971 | Rhodes et al. | 521/167 |
| 3,586,649 | 6/1971 | Cobbledick | 521/159 |
| 4,107,106 | 8/1978 | Dunleavy et al. | 521/164 |

*Primary Examiner*—Maurice J. Welsh
*Attorney, Agent, or Firm*—Richard J. Gallagher

[57] ABSTRACT

Rigid and semiflexible polyurethane foams having superior flame retardant properties are produced by incorporating into the pre-foam formulation the reaction product of a phenol, an aldehyde, and an aromatic amine.

6 Claims, No Drawings

RIGID AND SEMIFLEXIBLE POLYURETHANE FOAMS PRODUCED WITH PHENOL-ALDEHYDE-AMINE RESINS

BACKGROUND OF THE INVENTION

1. Field of the Invention

This invention relates to the use of phenol-aldehyde-amine resins to produce rigid and semiflexible polyurethane foams. The rigid and semiflexible foams produced according to this invention have, relative to similar foams produced without such resins, increased resistance to burning as well as to crumbling (friability).

2. Description of the Prior Art

Rigid polyurethane foams find commercial utility in varied areas ranging from high density molding applications such as in the production of decorative furniture replacements for wood to appliance and other pour-in-place insulation applications to various spray applications. Semiflexible polyurethane foams find commercial utility in automotive interior trim applications. In addition to requiring certain desirable physical properties relative to density, compression strength, friability, etc., such commercial applications require that the rigid and semiflexible foams have as low a degree of combustibility as possible.

Currently, relatively low degrees of combustibility are achieved commercially by incorporating into the rigid and semiflexible foam formulations various flame retardants such as non-reactive chlorinated phosphonate esters or reactive trichlorobutylene oxide based polyether polyols. However, even lower degrees of combustibilities are desirable.

U.S. Pat. No. 4,107,106 is concerned with elastomers (flexible and semiflexible) which are useful as energy absorbing components in automobile bumpers, crash pads, packaging, and the like. That patent utilizes a phenol-aldehyde-amine resin component as a curative to make its polyurethanes. However, the afore-mentioned patent teaches that the phenol-aldehyde-amine resin is utilized in conjunction with, and preferably premixed with, a diol curative. The diol curative of the patent, in combination with the resin, is taught to affect the strain rate sensitivity of the polyurethane elastomers prepared according to the process of the patent. U.S. Pat. No. 4,107,106 does not disclose or suggest that the phenol-aldehyde-amine resin lowers combustibility. In fact, no flame retardants of any kind are identified as such in that patent.

BRIEF SUMMARY OF THE INVENTION

It has now been found that combustibility properties, as indicated by e.g. ASTM E-84 flame spread tests, of rigid and semiflexible polyurethane foams can be improved materially by the incorporation into the pre-foam formulations of about 10 to 20 parts by weight (relative to the polyol component of said pre-foam formulation) of the reaction product of: (I) a phenol which has at least one unsubstituted reactive position on the aromatic nucleus, (II) an aldehyde, and (III) an aromatic amine. Accordingly, the present invention extends to such formulations, to their use in producing rigid and semiflexible polyurethane foams, and to rigid and semiflexible polyurethane foams which incorporate said reaction product.

DETAILED DESCRIPTION

The reaction mixtures suitable for producing rigid and semiflexible polyurethane foams according to this invention consist essentially of:

(a) a polyether polyol or blend of polyether polyols having an average hydroxyl number of greater than 100, (b) the reaction product of:
(I) a phenol which has at least one unsubstituted reactive position on the aromatic nucleus,
(II) an aldehyde, and
(III) an aromatic amine, (c) an aromatic polyisocyanate in an amount that provides from 0.8 to 1.6 isocyanato groups per active hydrogen group in the mixture, (d) a blowing agent, (e) a surfactant, and (f) a flame retardant additive.

The polyether polyols having average hydroxyl number of greater than 100 which comprise part (a) of the pre-foam formulation may be poly(propylene glycol)triols, poly(propylene glycol/ethylene glycol)triols, sorbitol/polypropyleneoxy polyols, sorbitol/polypropyleneoxy/polyethyleneoxy polyols, polyamine/polypropyleneoxy polyols, phosphoric acid/polypropyleneoxy polyols, oxyalkylated sucrose, mixtures thereof, and the like. The polyol functionality will generally be at least 3 and less than 8. Specific examples of polyols which may be used according to the present invention include a sucrose and triethanol amine mixture oxypropylated to a hydroxyl number of about 530, a sucrose and glycerine mixture oxypropylated to a hydroxyl number of about 360, and an oxypropylated Mannich reaction product of a phenol, an aldehyde, and an aromatic amine, hydroxyl number about 485.

The reaction products which comprise part (b) of the pre-foam formulations may be prepared by a suitable sequence of reaction steps. Thus, the phenol-aldehyde-amine resin is prepared by (1) a condensation reaction, (2) the reaction of anilines with methylol phenols, or (3) the reaction of anilines with phenolic resole resins. The following reaction sequence is illustrative of the condensation reaction:

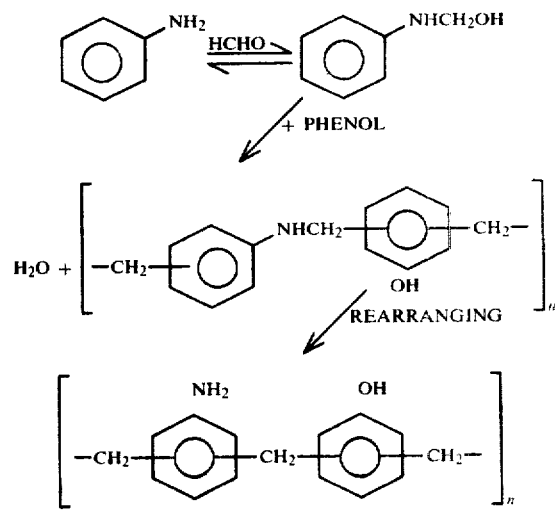

In this sequence, the initial reaction of the aldehyde with the aromatic amine produces an N(1-hydroxyalkyl) aromatic amine, which in turn condenses with the phenol. This product then rearranges to form an aminoarylhydroxyarylalkane. The amino group is thus free to react with additional formaldehyde, and the sequence of reactions is continued. By proper adjustment of the reaction conditions, the molecular structure of the condensation products can be controlled within readily reproducible limits, which permits a high degree of batch-to-batch uniformity. Whereas in the preferred embodiment of the present invention is conducted in the absence of a catalyst, it is within the scope of the invention to perform said condensation reaction in the presence of an acid or a basic catalyst if desired.

The phenols which can be employed in the condensation reaction to produce reaction products (b) are those phenols which have at least one unsubstituted reactive position on the aromatic nucleus. It is normally the case that the reactive positions on the aromatic nucleus are those which are ortho or para, and preferably ortho, to the hydroxyl group. Therefore, the phenols which have at least one unsubstituted position ortho or para to the hydroxyl groups can be used, but if only one unsubstituted reactive position is present, it is preferred that said reactive position be ortho to the phenolic hydroxyl group. The phenols which can be employed include, among others, phenol, the alkylphenols, the halophenols, the alkoxyphenols, the aminophenols, the dialkylaminophenols, the dihydroxybenzenes, the naphthols, and the like, which have at least one unsubstituted reactive position on the aromatic nucleus. Specific examples of phenols which can be employed include, among others phenol, o-, m-, and p-cresol, o-, m-, and p-ethylphenol, o-, m-, and p-propylphenol, para-butylphenol, and other butylphenols, the pentylphenols, the hexylphenols, the heptylphenols, the octylphenols, the nonylphenols, the decylphenols, the dodecylphenols, pentadecylphenols, the octadecylphenols, the dimethylphenols, the diethylphenols, the dipropylphenols, the dibutylphenols, cresylic acids and other mixtures of alkylphenols, para-aminophenol, chlorophenols, certain dichlorophenols, the bromophenols, o-, m-, and p-methoxyphenols, o-, m-, and o-ethoxyphenol, o-, m-, and p-butoxyphenol, o-, m-, and p-N,N-dimethylaminophenol, resorcinol, catechol, phloroglucinol and other trihydroxy benzenes, naphthols, dihydroxynaphthalenes, 2,2-bis(parahydroxyphenyl) propane, bis(parahydroxyphenyl) sulfone, and other bisphenols, aminophenols, trihydroxybiphenyl and other hydroxybiphenyls, and the like. The preferred phenols are those which can be represented by the formula

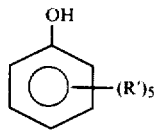

wherein each R' individually represents hydrogen, alkyl, preferably having not more than 18 carbon atoms, and more preferably not more than 10 carbon atoms, hydroxyl, amino, chloro, alkylamino, or dialkylamino wherein preferably the alkyl groups thereof have not more than 18 carbon atoms and more preferably not more than 10 carbon atoms, provided that at least one R' is a hydrogen that is bonded to a reactive position on the aromatic nucleus. The most preferred phenols are phenol, the alkylphenols, meta and para aminophenols, and the monochlorophenols.

The aldehydes which can be employed in the condensation reaction to produce reaction products (b) include, among others, formaldehyde, acetaldehyde, propionaldehyde, and the like. Formaldehyde is preferred. The aldehyde can be employed in water solution or in an organic solvent. It is preferred to employ the formaldehyde in solution in methanol or as the 37 weight percent aqueous solution known as formalin.

The aromatic amines which can be employed in the condensation reaction to produce reaction products (b) are those which are represented by the formula ArNHR wherein Ar is an aryl group which has at least one unsubstituted reactive position on the aromatic nucleus, and wherein R represents a hydrogen or an alkyl. Ordinarily, the reactive positions are those which are ortho and para to the amino group. Accordingly, aromatic amines which have at least one unsubstituted position ortho or para to the amino group are highly desirable for use in preparing the condensation products employed in the invention. Among the aromatic amines which can be employed are aniline, the aminophenols, benzenediamines, alkyl-substituted anilines, alkyl-substituted benzenediamines, N-alkyl-substituted anilines, the naphthylamines, N-alkyl-aminoanilines, the haloanilines, and the like. Specific examples of aromatic amines which can be employed include, among others, aniline; m- and p- benzenediamine, o-, m-, and p-toluidine; o-, m-, and p-ethylaniline; o-, m-, and p-butylaniline; 2,3-xylidine and other xylidines, 2,4- and 2,6-diaminotoluene and certain other diaminotoluenes; 1-ethyl-2, 4-diaminobenzene; 1-propyl-2, 4-diaminobenzene; 1-butyl-2, 4-diaminobenzene; o- and p-diethylaminoaniline; o- and p-dimethylaminoaniline; alpha-napthylamine and other mono- and polyaminonaphthalenes; para-aminophenol and other aminophenols; o-chloroaniline and other chloroanilines and bromoanilines; aromatic amine/formaldehyde condensation products such as diaminodiphenylmethanes, triaminotriphenylmethanes, and the like; bis(aminophenyl) sulfones such as bis(4-aminophenyl) sulfone, and the like; N-alkylanilines such as N-methylaniline, N-ethylaniline and higher N-alkylanilines, N-methyltoluidines, and all of the aromatic amines enumerated above having N-alkyl substituents, but containing at least 1 amino hydrogen, and the like. The preferred aromatic amines are those which can be represented by the formula

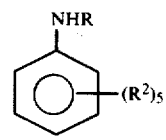

wherein R represents hydrogen or alkyl, preferably of not more than 4 carbon atoms, and wherein each $R^2$ individually represents a hydrogen, amino, alkylamino or dialkylamino wherein the alkyl groups thereof preferably have not more than 18 carbon atoms and more preferably not more than 10 carbon atoms, or hydroxyl, provided that at least one $R^2$ represents a hydrogen that is bonded to a reactive position on the aromatic nucleus. The more preferred amine is aniline.

The proportion of the reactants employed in the condensation reaction to produce reaction products (b) can be varied over a wide range. For example, for phenol and aniline themselves, the phenol-aniline molar ratio can be varied from about 15:1, and higher, to about 1:15, and lower. A desirable molar ratio of phenol-aniline is between about 9:1 and 1:9. The preferred molar ratio of phenol-aniline is in the range of from about 6:1 to about 1:6, and most preferably, from about 3:1 to about 1:3. When substituted and polyfunctional phenols and aniline are employed the ratio of (phenol+aniline): aldehyde can be varied from about 20:1, and higher to about 1:1, and lower. The preferred molar ratio of (phenol+aniline): aldehyde is from about 6:1 to about 1.2:1, and most preferably, from about 4:1 to about 1.4:1. Again, when substituted and polyfunctional phenols and aniline are employed, the ratio may vary somewhat from those indicated.

The preferred reaction products (b) are those which are permanently fusible. The preparation of the permanently fusible reaction products is dependent chiefly upon the amount of aldehyde employed. As a guide, it has been found that when molar ratio of (phenol+aniline): aldehyde is smaller that about 1.2:1, it becomes increasingly difficult to avoid residual reactivity which promotes crosslinking of the reaction products. Although the reaction products which are crosslinked, i.e., not permanently fusible, can be employed in the invention, the processing advantages attendant with the use of permanently fusible condensation product are apparent, and for that reason, the permanently fusible reaction products are preferred.

The preferred method of carrying out the condensation reaction to produce reation products (b) is to add the aldehyde slowly to a agitated mixture of phenol and aromatic amine, said mixture being maintained at a temperature of from about 0° C., to about 180° C. during the addition. After the addition of aldehyde which can take from about 30 minutes to about 20 hours or longer, the reaction mixture is maintained at or above the temperature at which the aldehyde was charged for up to 2 hours. At the end of the reaction period, the reaction product can then be recovered by stripping off water, unreacted reagents, and any solvents that may be present, by heating to about 160° C.-200° C. and thereafter reducing the pressure.

Conventional equipment can be employed for the condensation reaction to produce reaction products (b). For example, a reaction kettle equipped with agitator, means for reflux and distillation nitrogen inlet means, and conventional heat transfer means, is suitable. The material of construction can be steel, stainless steel, glass, monel, and the like.

In producing polyurethane foams in accordance with the present invention, a solid phenol-aldehyde-amine reaction product can be melted, e.g. at 90°-100° C., and then mixed with the polyether polyol system. Alternatively, and preferably, the still liquid reaction product obtained as described above, i.e. before it has solidified, can be mixed directly into the polyether polyol(s).

The aromatic polyisocyanates which comprise part (c) of the formulation include such aromatic isocyanates as 2,4-tolylene-diisocyanate, 2,6-tolylenediisocyanate, mixtures thereof, methylene-4,4'-diphenyldiisocyanate, isophoronediisocyanate methylene-4,4'-dicyclohexyldiisocyanate, and polymethylene polyphenylisocyanates having the formula:

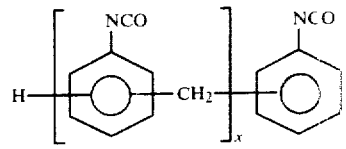

wherein x has an average value from 1.1 to 5 inclusive (preferably from 2.0 to 3.0), and the like. A specific example of an aromatic polyisocyanate which may be used according to the present invention Upjohn's PAPI 135.

Urethane formation in the present process of this invention is catalyzed by the phenol-aldehyde-amine resin which is added to the pre-form formulation in order to improve the combustibility properties of the resulting foam. Such autocatalysis is another advantage of the present invention. In some cases, however, it may be desirable to utilize in addition a small amount of a conventional polyurethane catalyst. The polyurethane catalysts which may be employed in the process of this invention to accelerate the cure of the reaction mixture include organic amines and organometallic compounds such as lead octoate, dibutyltin dilaurate. tin octoate, cobalt octoate, triethylene diamine, dimethylethanolamine, and mixtures thereof.

The blowing agents (d) employed in the process of this invention, include any compound capable of generating an inert gas under the conditions used to cure the polyurethane foam (e.g., by reaction to produce a gas or by volatilization). Suitable blowing agents include water and volatile halocarbons (especially chlorocarbons and chlorofluorocarbons) such as methylene chloride, trichloromonofluoromethane, dichlorodifluoromethane, dichloromonofluoromethane, dichloromonofluoromethane, dichlorodifluoromethane, dichloromofluoromethane, dichloromethane, trichloromethane, bromotrifluoromethane, chlorodifluoromethane, chloromethane, 1,1-dichloro-1, 1-difluoromethane, 1,1-difluoro, 1,2,2-trichloromethane, 1-chloropentafluoroethane, 1-chloro-1-fluoroethane, 1-chloro-2-fluoroethane, 1,1,2-trifluoroethane, 2-chloro-1,1,2,3,3,4,4,-heptafluorobutane, hexafluorocyclobutane, and octofluorobutane. Other useful blowing agents include low-boiling hydrocarbons such as butane, pentane, hexane, cyclohexane and the like. The amount of the blowing agent employed is determined by the desired densities of the cellular polyurethanes to be produced. In this connection, the rigid and semiflexible foams produced by the process of this invention can be designed to have densities from 1 to 70 pounds per cubic foot. Such densities can be achieved by employing from 0 to 50 parts by weight of a blowing agent (such a methylene dichloride or trichloromonofluoromethane) per 100 parts by weight of the polyol blend. In addition, a water blowing agent may be employed in amounts of 0.5 to 4 parts by weight of water per 100 parts by weight of polyol.

It is also within the scope of the invention to employ small amounts, e.g., about 0.001% to 5.0% by weight, based on the total reaction mixture of a surfactant foam stabilizer (e) such as a "hydroylzable" polysiloxane-polyoxyalkylene block copolymer such as the block copolymers described in U.S. Pat. Nos. 2,834,748 and 2,917,480. Another useful class of foam stabilizers are the "nonhydolyzable" polysiloxane-polyoxyalkylene block copolymers such as the block copolymers described in U.S. Pat. No. 3,505,377, U.K. Pat. No. 1,341,028, and British Pat. No. 1,220,471. The latter class of copolymers differs from the above-mentioned polysiloxane-polyoxyalkylene block copolymers in that the polysiloxane moiety is bonded to the polyalkylene moiety through direct carbon-to-silicon bonds, rather than through carbon-to-oxygen to-silicon bonds. These various polysiloxane-polyoxyalkylene block copolymers preferably contain from 5 to 50 weight percent of polysiloxane polymer with the remainder being polyoxyalkylene polymer.

Foamable reaction mixtures according to the present invention may also include conventional flame retardant chemicals (F). The flame retardant chemicals currently produced commercially are of two distinct types. The non-reactive additives, often halogenated compounds, are generally added to the polymer during the processing but do not react chemically with the other constituents of the composition. Such non-reactive additives include chlorinated phosphonate esters such as poly-beta-chloro-ethyltriphosphonate

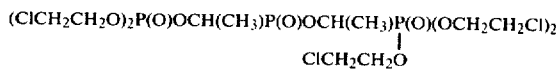

The reactive additives, on the other hand, are generally chemically incorporated into the polymer structure itself. Among the reactive flame retardants which can be utilized according to the present invention are chlorendic acid and anhydride, phosphorous-containing polyols, e.g. N,N-bis (2-hydroxyethyl)aminomethylphosphonate, and chlorine-containing polyols of varying compositions such as trichlorobutylene oxide-based polyether polyols.

Additionally, substances such as phenothiazine may be added to the pre-foam formulations in order to improve resistance to scorch.

In the process of this invention, the foamable reaction mixtures can be formed and cured in accordance with the standard techniques known in the art. Thus where rigid and semiflexible polyurethane foams are to be produced, a suitable process sequence is as follows:

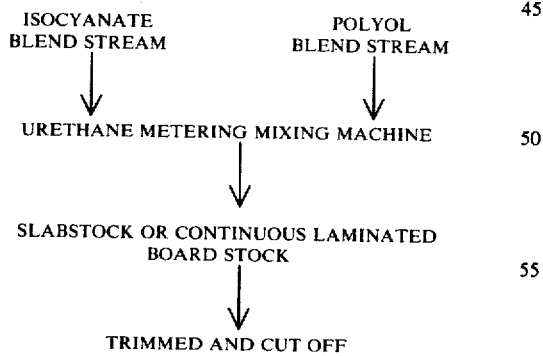

Since the polyurethane-foaming and polyurea-forming reactions involved in the cure of the reaction mixtures are exothermic, curing can usually be accomplished with the application of the minimal heat from an external source.

In the practice of the process of this invention, one or more of each of the starting materials can be employed. In fact, it is often preferable to employ more than one of at least some of the starting materials, particularly the organic polyisocyanate (i.e., mixtures of polymeric isocyanates).

EXAMPLES

The following experimental descriptions illustrate the present invention.

Rigid and semiflexible urethane foam systems were processed on a conventional flexible urethane foam slab stock metering mixing machine producing rigid and semiflexible urethane foam buns. The urethane foam systems were processed at ambient temperature at a through-put of about 50 pounds per minute. The formulations and processes were sized to produce bun stock pieces of 12 to 14 feet in length about 3 feet in width, and 12 to 14 inches in height.

The foams produced in Examples 1-3 were very rigid; the foams produced in Example 4 and 5 were somewhat more flexible. Test specimens were prepared for each material from the bun stock and subjected to standard ASTM tests.

In the ASTM E-84 Flame Spread test, a substance must score less than 75 to be classified as a Class II Flame Retardant Material. In the ASTM E-84 Smoke test, a substance must score less than 450 to be classified as a Class II Flame Retardant Material. In both tests, the lower the score the better.

In the physical property data below, "K Factor" is a measure of the insulation power of a material (the lower the number the better). "PARL" means parallel and "PERP" means perpendicular. The Vh reading reflects volume change as a result of exposure to humidity. Among the materials used in the examples were:

PFAR—A reaction product of phenol, formaldehyde, and aniline, prepared as follows:

A reactor is charged with a 50:50 wt. percent mixture of phenol and aniline at 50° C. and 15 psig nitrogen. The reactor is heated to 90° C. Formaldehyde is fed into the reactor in an amount of about 10 wt. percent of the phenolaldehyde mixture, while the reactor temperature is maintained at 90° C. After the formaldehyde has been fed into the reactor, the pressure is reduced to zero psig and the mixture is heated to 180° C. and held at that temperature for 1 hour, during which time a distillate of water of condensation is removed. The mixture is then maintained at 180° C. and 15 mm Hg for 6 hours. During which time a distillate of unreacted phenol and aniline is removed. The yield of PFAR product in the reactor is about 52 wt % of the initial reaction mixture.

Typically, PFAR has a viscosity of 3,000–13,000 centistokes at 210° F., a viscosity of 16–25 centistokes at 180° C., a melting point of 60°–80° C., and a density of 1.10–1.15 grams/cubic centimeter at 180° C.

Isocyanate P—A polymeric polyaryl-polyisocyanate prepared by phosgenation of aniline and formaldehyde in a mineral acid, the polyisocyanate having about 31–32% active NCO groups (commercially available at PAPI 135).

Polyol F—A sucrose and triethanol amine mixture oxypropylated to a hydroxyl number of about 530.

Polyol H—A sucrose and glycerin mixture oxypropylated to a hydroxyl number of about 360.

Polyol A—A oxypropylated Mannich reaction product of a phenol, an aldehyde, and an aromatic amine, i.e. oxypropylated PFAR, hydroxyl number about 485.

Retardant A—A chlorinated phosphonate ester nonreactive flame retardant (commercially available as "AB-78").

Retardant R—A trichlorobutylene oxide-based polyolether polyol reactive flame retardant (commercially available as "RF-230").

In the comparisons below, since PFAR contains active hydrogen, when PFAR was present less polyol was used. The blowing agent amounts were adjusted in order to obtain, as nearly as possible, equal density foams. In Examples IV and V, a small amount of tin catalyst was added to the PFAR embodiments to decrease the tack-free time.

EXAMPLE I

Ten parts by weight of PFAR was dissolved in 90 parts by weight of Polyol F. To the polyol solution was added 33 parts by weight of fluorotrichloromethane, one part by weight of a hydroxy-terminated siloxane-polyoxyalkylene block copolymer surfactant, 0.2 parts by weight of phenothiazine, and 8 parts by weight of Retardant A. The resulting polyol stream was mixed with an isocyanate stream consisting of Isocyanate P (NCO Index=110). A control formulation was prepared by adding, to 100 parts by weight of Polyol F, 35 parts by weight of fluorotrichloromethane, one part by weight of a hydroxy-terminated siloxane-polyoxyalkylene block copolymer surfactant, 0.2 parts by weight of phenothiazine, 0.6 parts by weight of dimethylethanolamine catalyst, and 8 parts by weight of Retardant A, an isocyanate stream consisting of Isocyanate P (NCO Index=110). ASTM E-84 flame tunnel data and physical properties are presented below:

| ASTM E-84* | CONTROL | INVENTION |
|---|---|---|
| Flame Spread | 80 | 59 |
| Smoke | 669 | 630 |
| Physical Properties | | |
| Density, pcf | 2.2 | 2.2 |
| Friability, % at 10 minutes | 27 | 3 |
| Friability, % at 20 minutes | 48 | 13 |
| K Factor (ASTM 518), initial | 0.138 | 0.132 |
| Closed Cell, % | 89 | 91 |
| Compression Strength, psi PARL | 32 | 41 |
| Compression Deflection, % PARL | 4 | 4 |
| Compression Strength, psi PERP | 21 | 19 |
| Compression Deflection, % PERP | 5 | 5 |
| Vh at 28 days, % | 6.8 | 8.3 |

*This numerical flame spread rating is not intended to reflect hazards presented by this or any other materials under actual fire conditions.

EXAMPLE II

Ten parts by weight of PFAR was dissolved in 60 parts by weight of Polyol F. To the polyol solution was added 28 parts by weight of fluorotrichloromethane, one part by weight of hydroxy-terminated siloxane-polyoxyalkylene block copolymer surfactant, 0.2 parts by weight of phenothiazine, and 30 parts by weight of Retardant R. The resulting polyol stream was mixed with an isocyanate stream consisting of Isocyanate P (NCO Index=110). A control formulation was prepared by adding, to 70 parts by weight of Polyol F, 30 parts by weight of fluorotrichloromethane, one part by weight of a hydroxy-terminated siloxane-polyoxyalkylene block copolymer surfactant, 0.2 parts by weight of phenothiazine, 0.8 parts by weight of dimethyethanolamine catalyst, and 30 parts by weight of Retardant R, an isocyanate stream consisting of Isocyanate P (NCO Index=110) ASTM E-84 flame tunnel data and physical properties are presented below:

| ASTM E-84 | CONTROL | INVENTION |
|---|---|---|
| Flame Spread | 64 | 54 |
| Smoke | 403 | 489 |
| Physical Properties | | |
| Density, pcf | 2.2 | 2.3 |
| Friability, % at 10 minutes | 16 | 9 |
| Friability, % at 20 minutes | 33 | 18 |
| K Factor (ASTM 518) initial | 0.142 | 0.129 |
| Closed Cell, % | 91 | 91 |
| Compression Strength, psi PARL | 36 | 49 |
| Compression Deflection, % PARL | 5 | 5 |
| Compression Strength, psi PERP | 19 | 23 |
| Compression, Deflection, % PERP | 5 | 5 |
| Vh at 28 days, % | 6.2 | 7.3 |

*This numerical flame spread rating is not intended to reflect hazards presented by this or any other materials under actual fire conditions.

EXAMPLE III

Ten parts by weight of PFAR was dissolved in 50 parts by weight of Polyol A. To the polyol solution was added 26 parts by weight of fluorotrichloromethane, one part by weight of a hydroxy-terminated siloxane-polyoxyalkylene block copolymer surfactant, 0.2 parts by weight of phenothiazine, and 40 parts by weight of Retardant R. The resulting polyol stream consisting of Isocyanate P (NCO Index=110). A control formulation was prepared by adding, to 60 parts by weight of Polyol A, 27 parts by weight of fluorotrichloromethane, one part by weight of a hydroxy-terminated siloxane-polyoxyalkylene block copolymer surfactant, 0.2 parts by weight of phenothiazine, and 40 parts by weight of Retardant R, and isocyanate stream consisting of Isocyanate P (NCO Index=110). Polyol A (like PFAR) catalyze urethane formation in both of these systems. ASTM E-84 flame tunnel data and physical properties are presented below:

| ASTM E-84* | CONTROL | INVENTION |
|---|---|---|
| Flame Spread | 76 | 33 |
| Smoke | 624 | 601 |
| Physical Properties | | |
| Density, pcf | 2.2 | 2.2 |
| Friability, % at 10 minutes | 11 | 9 |
| Friability, % at 20 minutes | 22 | 17 |
| K Factor (*ASTM 518), initial | 0.131 | 0.128 |
| Closed Cell, % | 92 | 91 |
| Compression Strength, psi PARL | 30 | 37 |
| Compression Deflection, % PARL | 5 | 5 |
| Compression Strength, psi PERP | 26 | 29 |
| Compression Deflection, % PERP | 6 | 5 |
| Vh at 28 days, % | 6.7 | 4.1 |

*This numerical flame spread rating is not intended to reflect hazards presented by this or any other materials under actual fire conditions.

EXAMPLE IV

Ten parts by weight of PFAR was dissolved in 90 parts by weight of Polyol H. To the polyol solution was added 36 parts by weight of fluorotrichloromethane, one part by weight of a hydroxy-terminated siloxane-polyoxyalkylene block copolymer surfactant, 0.2 parts by weight of phenothiazine, 0.05 parts by weight of dibutyltin dilaurate, and 9 parts by weight of Retardant A. The resulting polyol stream was mixed with an isocyanate stream consisting of Isocyanate P (NCO Index = 110). A control formulation was prepared by adding, to 100 parts by weight of Polyol H, 30 parts by weight of fluorotrichloromethane, one part by weight of a hydroxy-terminated siloxane-polyoxyalkylene block copolymer surfactant, 0.2 parts by weight of phenothiazine, 4 parts by weight of dimethylethanolamine catalyst, and 9 parts by weight of Retardant A, and isocyanate stream consisting of Isocyanate P (NCO Index = 110). ASTM E-84 flame tunnel data and physical properties are presented below:

| ASTM E-84* | CONTROL | INVENTION |
|---|---|---|
| Flame Spread | 1670 | 136 |
| Smoke | 495 | 803 |
| Physical Properties | | |
| Density, pcf | 2.0 | 2.3 |
| Friability, % at 10 minutes | 39 | 4 |
| Friability, % at 20 minutes | 61 | 8 |
| K Factor (ASTM 518), initial | 0.157 | 0.133 |
| Closed Cell, % | 89 | 91 |
| Compression Strength, psi PARL | 25 | 33 |
| Compression Deflection, % PARL | 4 | 5 |
| Compression Strength, psi PERP | 18 | 20 |
| Compression Deflection, % PERP | 5 | 5 |
| Vh at 28 days, % | 2.6 | 7.3 |

*This numerical flame spread rating is not intended to reflect hazards presented by this or any other materials under actual fire conditions.

EXAMPLE V

Ten parts by weight of PFAR was dissolved in 60 parts by weight of Polyol H. To the polyol solution was added 25 parts by weight of fluorotrichloromethane, one part by weight of a hydroxy-terminated siloxane-poloxyalkylene block copolymer surfactant, 0.2 parts by weight of phenothiazine, 0.04 parts by weight of dibutyltin dilaurate, and 30 parts by weight of Retardant R. The resulting polyol stream was mixed with an isocyanate stream consisting of Isocyanate P (NCO Index = 98). A control formulation was prepared by adding, to 70 parts by weight of Polyol H, 25 parts by weight of fluorotrichloromethane, one part by weight of a hydroxy-terminated siloxane-polyoxyalkylene block copolymer surfactant, 0.2 parts by weight of phenothiazine, 3 parts by weight of dimethylethanolamine catalyst, and 30 parts by weight of Ratardant R, an isocyanate stream consisting of Isocyanate P (NCO Index = 110). ASTM E-84 flame tunnel data and physical properties are presented below:

| ASTM E-84* | CONTROL | INVENTION |
|---|---|---|
| Flame Spread | 2000 | 72 |
| Smoke | 447 | 386 |
| Physical Properties | | |
| Density, pcf | 2.3 | 2.3 |
| Friability, % at 10 minutes | 18 | 8 |
| Friability, % at 20 minutes | 35 | 15 |
| K Factor (ASTM 518), initial | 0.153 | 0.134 |
| Closed Cell % | 90 | 91 |
| Compression Strength, psi PARL | 34 | 38 |
| Compression Deflection, % PARL | 5 | 5 |
| Compression Strength, psi PERP | 22 | 23 |
| Compression Deflection, % PERP | 6 | 5 |
| Vh at 28 days % | 14.2 | 5.5 |

*This numerical flame spread rating is not intended to reflect hazards presented by this or any other materials under actual fire conditions.

As demonstrated by the preceding examples, the incorporation of a reaction product of a phenol which has at least one unsubstituted reaction position on the aromatic nucleus, an aldehyde, and an aromatic amine into flame-retarded rigid polyurethane foams results in lower ASTM E-84 flame spread, decreased friability, lower K factor, and higher compression strength with no apparent detriment to any of the other physical properties measured. Incorporation of the phenol-aldehyde-amine reaction products into non-retarded rigid and semiflexible foams would improve their physical properties also.

What is claimed is:

1. A process for producing a rigid or semiflexible polyurethane foam which comprises forming and curing reaction mixture consisting essentially of
   (a) a polyether polyol, or blend of polyether polyols, having a hydroxyl number of greater than 100 and a functionality of at least 3 and less than 8,
   (b) the reaction product of:
      (I) a phenol which has at least one unsubstituted reactive position on the aromatic nucleus,
      (II) an aldehyde, and
      (III) an aromatic amine,
   (c) an aromatic polyisocyanate in an amount which provides from 0.8 to 1.6 isocyanate groups per active hydrogen group in the reaction mixture,
   (d) a blowing agent,
   (e) a surfactant, and
   (f) a flame retardant additive.
2. A rigid or semiflexible polyurethane foam produced by the process of claim 1.
3. A process as in claim 1 wherein component (b) of the formulation is the reaction of:
   (I) phenol,
   (II) formaldehyde, and
   (III) aniline,
wherein the molar ratio of (I) to (III) ranges from about 6:1 to about 1:6 and wherein the molar ratio of (I) plus (III) to (II) ranges from about 6:1 to about 1.2:1.
4. A rigid or semiflexible polyurethane foam produced by the process of claim 3.
5. A process as in any one of claims 1, or 3 wherein the product is a rigid polyurethane foam.
6. A rigid polyurethane foam produced by the process of claim 5.

* * * * *